US006209278B1

United States Patent
Tychsen

(10) Patent No.: US 6,209,278 B1
(45) Date of Patent: Apr. 3, 2001

(54) FLOORING PANEL

(75) Inventor: Detlef Tychsen, Loehne (DE)

(73) Assignee: Kronotex GmbH, Heiligengrabe (DE)

( * ) Notice: Subject to any disclaimer, the term of this patent is extended or adjusted under 35 U.S.C. 154(b) by 0 days.

(21) Appl. No.: 09/414,965

(22) Filed: Oct. 12, 1999

(30) Foreign Application Priority Data

Nov. 6, 1998 (DE) .............................................. 198 51 200

(51) Int. Cl.[7] .................................................. E04B 2/08
(52) U.S. Cl. ........................................ 52/592.4; 52/592.1
(58) Field of Search ................. 52/592.1, 592.4

(56) References Cited

U.S. PATENT DOCUMENTS

| 1,581,345 | * | 4/1926 | Healy | 52/592.4 X |
| 3,200,553 | * | 8/1965 | Frashour et al. | 52/592.4 |
| 5,502,939 | * | 4/1996 | Zadok et al. | 52/592.1 X |
| 6,006,486 | * | 12/1999 | Moriau et al. | 52/589.1 |

FOREIGN PATENT DOCUMENTS

| 3-169967 | 7/1991 | (JP) . |
| WO94/26999 | 11/1994 | (WO) . |
| WO97/47834 | 12/1997 | (WO) . |

* cited by examiner

*Primary Examiner*—Janet M. Wilkens
(74) *Attorney, Agent, or Firm*—McGuireWoods LLP

(57) ABSTRACT

Flooring panel with two connection members whose sides face each other for attachment to other flooring panels of the same type. A first connection member has an upper projection, a lower projection, and groove between them. A second connecting member features a tongue for insertion in the groove of an adjacent connection member. In order to achieve good assembly as well as economical production of the panels, provision is made for a lower protuberance, lower indentation, lower auxiliary protuberance, and lower auxiliary indentation on the lower projection of the first connection member. The profile thus created is fitted to a corresponding profile on the lower side of the tongue which has an upper indentation, an upper protuberance, an upper auxiliary indentation, and an upper auxiliary protuberance.

12 Claims, 3 Drawing Sheets

FLOORING PANEL

BACKGROUND OF THE INVENTION

1. Field of the Invention

The present invention generally relates to flooring panels and, more particularly, to flooring panels having connection members for simply and effectively installing adjacent flooring panels to one another.

2. Background Description

WO 97/47384 A1 shows flooring panels in FIGS. 5–7 and FIGS. 22–25. Specifically, these flooring panels may be connected to one another without, for example, the need to glue them to the sub-floor or connecting them with additional connection devices such as tracks. The connection members of two flooring panel can thereby be joined parallel to the sub-floor by linearly sliding them into each other; however, in order to achieve a seamless joint between the connection members the lower projection of the first connection member must be bent downwards during the connecting process and, due to its elastic properties, snap back to its original configuration thereby catching the upper projection on the under side of the tongue. This results in the inability to again separate the two connecting members by simple linear sliding.

Alternatively, it is possible to introduce the second connecting member into the first connecting member with an arc-like movement. In this manner, the bending movement of the lower projection can be minimized while still achieving stability of the connection with respect to lateral separation.

However, a problem with such prior art connecting members is that a previously laid flooring panel must be significantly raised when joining additional flooring panel. This is due to the fact that the previously laid flooring panel is usually connected with other panels thereby making it difficult to raise from the sub-floor. It is also noted that the connecting member may be damaged since there may be too much stress on the lower projection and/or the tongue.

As a further problem, high strains may be created on both connecting members in the lower region between the lower projection of the first connection member and the tongue of the second connection member subsequent to the installation thereof This is because high strain is directed to these connecting member due to a tight "fit" achieved at the upper side of the installation ledges of the connecting members and also on the sub-floor side. Additionally, the production of these connection members, which have a complex form especially inside the groove, is technically difficult. This is due to the milling of the connection members being complex thus increasing the costs typically attributable to the expensive machinery.

SUMMARY OF THE INVENTION

The present invention overcomes the above problems, and creates a flooring panel that is easy to lay, achieves good tightness of the connecting members, and can be produced at a relatively low cost. These advantages are provided by a flooring system that includes connection members as described below.

The present invention is directed to a flooring panel which includes a first connection member and a second connection member. The first connection member includes an upper projection having a first installation ledge, a lower projection having a lower indentation and protuberance, and a groove between the upper and lower projection. The second connection member, located opposite the first connection member, includes a second installation ledge whose underside has a tongue for joining with the groove of an adjacent first connecting member of another flooring panel. The underside of the tongue has an upper protuberance and an upper indentation next to the upper protuberance, and the lower indentation is designed to accept the upper protuberance while the groove is designed to accept the lower protuberance. In addition, the tongue and the groove are designed to slope in the direction of the base of the groove.

In other words, the connection members of the present invention include a tongue having an upper auxiliary protuberance and an upper auxiliary indentation on its underside while a lower projection has a lower auxiliary protuberance and a lower auxiliary indentation. The lower auxiliary protuberance fits in the upper auxiliary indentation of an adjacent flooring panel and the lower auxiliary indentation similarly fits the upper auxiliary protuberance of an another flooring panel. The lower protuberance, lower auxiliary protuberance, lower indentation and lower auxiliary indentation are positioned on the lower projection preferably outside the groove and extend to the outer end of the first connection member at the first installation ledge.

Through the configuration of the lower auxiliary protuberance and upper auxiliary protuberance that can be joined with the corresponding lower auxiliary indentation and upper auxiliary indentation of other adjacent connection members, it is now possible to inexpensively achieve a tight fit between adjacent flooring panels through the upper protuberance, upper auxiliary protuberance, upper indentation, upper auxiliary indentation, lower protuberance, lower indentation, lower auxiliary protuberance, and lower auxiliary indentation. Such a tight fit between adjacent flooring panels also provides tight fitting on the surfaces and/or edges facing the sub-floor. Thus, tight fitting flooring panels with bearing forces distributed over several points or surfaces is achieved. This results in a good durability of the connection in a simple manner even with exertion of higher forces and strains.

Also, since the upper protuberance, upper auxiliary protuberance, upper indentation, and upper auxiliary indentation on the lower side of the tongue of the second connection member and the lower protuberance, lower auxiliary protuberance, lower indentation, and lower auxiliary indentation are located in well set-out locations, e.g., outside the groove and further out than the first installation ledge, these shapes can be produced very precisely and at relatively low cost. This results in a relatively less manufacturing time due to the small use of tools, such as, for example, milling machines, and a relatively low production cost.

Since the indentations, auxiliary indentations, protuberances, and auxiliary protuberances are formed outside the groove and further out than the installation ledge, the second connection member can be very easily lifted during the joining of the panels (without the tongue already firmly residing in the groove) so that a slight lifting of the second connection member is made possible with little or no distortion.

Inasmuch as the tongue and the groove slope in the direction of the base of the groove, it is also possible to obtain a self-centering of the connection members. Advantageously, the groove slopes over its whole length and the tongue also slopes along its whole length or at least along the length of the groove. Due to this configuration, it is possible to obtain self-centering and therefore adequate "force" distribution along the length of the groove, while simplifying the joining process. Thereby, the danger of damaging the tongue or a projection is minimized by the excellent joining ease and force distribution provided by the invention.

Thus, by using the invention it is now possible to produce a connection profile on the lower projection and the tongue that provides a seal with four bearing surfaces. This results in excellent tightness between adjoining flooring panels, and excellent distribution of the support on the lower installation point over a large surface without the need to significantly bend the lower projection during the installation process. It is noted that this type of connection is especially well suited for the longitudinal edge of a flooring panel because the connection has either a small bending of the lower projection or an arc-like relative motion between the connection members. Thus, the flooring panels can be assembled by joining the longitudinal edges and then by longitudinally sliding further flooring panels until a connection of the cross-edge with another flooring panel is achieved.

Inasmuch as the upper and lower side of the tongue and the groove are in the form of flat surfaces, it is still further possible to achieve excellent self-centering and a uniform smooth joining process during the joining of the connection members. In addition, it is now possible to achieve good fit and force introduction. Thereby, the damage to the tongue and/or a projection, during the installation (e.g., joining) process or due to an ensuing load is further reduced. Also, a sloping tongue with flat, opposingly inclined surfaces has high stability. The groove is specifically formed as a groove so that a tongue-in-groove joint is established.

A cross-edge can be advantageously formed with rounded protuberances and auxiliary protuberances. This design does not achieve as large a seal surface as is feasible with non-rounded protuberances; however, the straight-line joining movement is facilitated, and there still remain four contact points between the upper and the lower profile. This ensures a good tightness between adjoining flooring panels. The protuberances may even be selected so that no, or practically no, bending of the lower projection towards the sub-floor is necessary.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
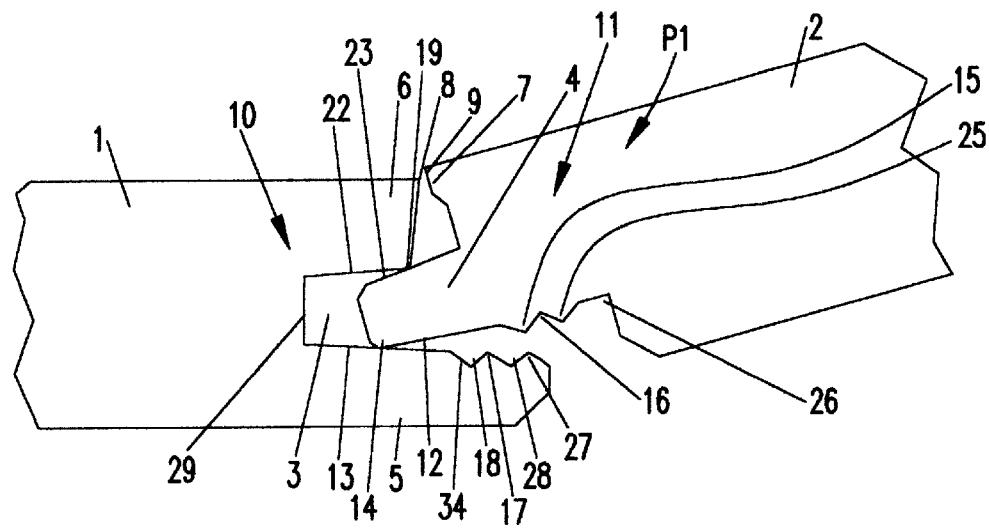
FIG. 1 shows a cross-section of two connection members according to a first embodiment of the invention, in the process of joining.
Figure 2:
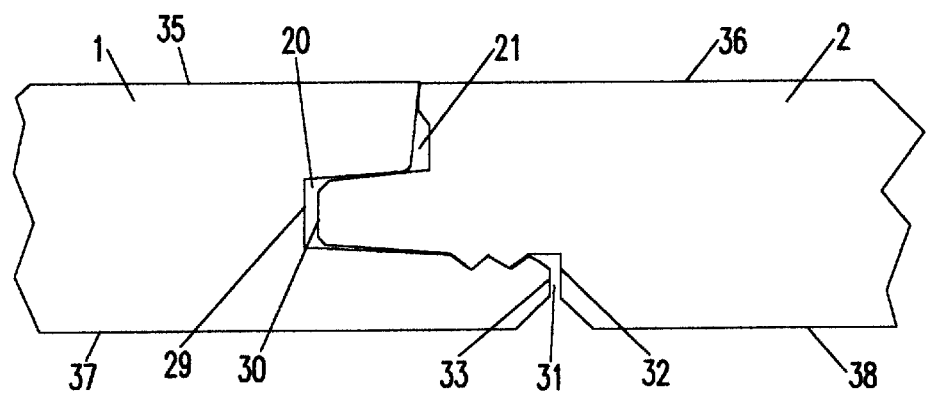
FIG. 2 shows the connection members of FIG. 1 after joining.

Referring now to the drawings, and more particularly referring to FIG. 1, there is shown a connection panel 1 which includes a first connection member 10 and on the opposite side a second connection member 11. Both connection members 10 and 11 are shaped so that they are appropriate for face-to-face engagement with each other, as is shown in FIGS. 1 and 2.

The first connection member 10 of flooring panel 1 has an upper projection 6, a lower projection 5, as well as a groove 3 between the projections 5 and 6. An installation ledge 8 is formed on the upper end of the upper projection 6. The groove 3 shows a groove-base 29 limited by the upper side 13 of the lower projection 5 and the lower side 22 of the upper projection 6, whereby the lower side 22 of the upper projection 6 and the upper side 13 of the lower projection 5 are slanted towards the groove-base 29. This configuration results in the groove 3 being tapered toward the groove-base 29.

At the outer end of the lower projection 5 is a connection profile that has a lower protuberance 27 and a lower indentation 28 towards the groove-base 29. According to the invention, an auxiliary protuberance 17 is located next to the lower protuberance 28 as well as a lower auxiliary indentation 18 adjacent in the groove-base direction. Moreover, the lower protuberance 27 and the auxiliary lower protuberance 17 are preferably located essentially on the extension line of the upper side 13 of the lower projection 5 (e.g., extending beyond the groove 3). However, the lower protuberance 27 and the auxiliary lower protuberance 17 may overlap somewhat with the extension line.

Still referring to FIG. 1, the flooring panel 2 has a tongue 4 on the second connection member 11. The tongue 4 is for joining, i.e. engagement, in the groove 3. A connecting flange 7 projects outward above the tongue 4. On the outer side of the connecting flange 7 is a second installation ledge 9 which upon connection of both connection members 10 and 11 adjoins the first installation ledge 8 of the first flooring panel 1. The tongue 4 has an essentially planar, preferably completely planar, upper side 23 and underside 12 that are tapered towards a front of the tongue 4.

A second connection profile is formed on the underside of the tongue 4 that has an upper indentation 26 which defines the lower end of the tongue 4 as well as an upper protuberance 25 adjacent to the upper indentation 26. Additionally, according to the invention, an upper auxiliary protuberance 15 is provided next to the upper protuberance 25 as well as an upper auxiliary indentation 16 between the upper protuberance 25 and the upper auxiliary protuberance 15.

Both connection members 10 and 11 of the flooring panels 1 and 2 are joined by an arching movement in the direction of arrow P1 of FIG. 1. At the same time, the flooring panel 1 with the first connection member 10 is preferably already laid on the sub-floor so that the second flooring panel 2 with the second connecting member 11 can be fitted by an arching movement in the direction of arrow P1. Also, the tongue 4 is introduced into the groove 3 whereby the upper side 23 of the tongue 4 can slide along a slip-point 19 of the upper projection 6 and a lower glide point 14 on the underside of the tongue 4 can slide along the upper side 13 of the lower projection 5. At least in the final phase of the introduction movement, the installation ledges 8 and 9 lay next to each other resulting in an essentially circular motion until both connection members 10 and 11 are joined as seen in FIG. 2.

Referring to FIG. 2, when in the joined position, upper sides 35 and 36 and undersides 37 and 38 of the flooring panels 1 and 2, respectively, constitute straight lines. That is, the upper sides 35 and 36 are an uninterrupted line. Both flooring panels 1 and 2 are joined on both their upper and lower side at their installation ledges 8 and 9 by their connection profiles. Thereby an upper free space 21 is created between the installation ledges 8 and 9 and the contact point of slide point 19 and the tongue upper side 23. Also, a lower free space 20 is created between the groove-base 29 and the front end 30 of the tongue 4. Particles, such as dust, etc. present on the connecting members before joining, can be pressed into these free spaces 20 and 21 without disturbing the integrity of the connection between the two flooring panels 1 and 2. On the undersides, a gap 31 is created between the substantial vertical lower edge 32 of the second connection member 11 and the substantial vertical edge 33 of the lower projection 5 of the first connecting member 10 so that the installation in the lower area is assured by both connection profiles. Thus, the lower protuberance 27 of the lower projection 5 fits in the upper indentation 26, the lower auxiliary protuberance 17 fits in the upper auxiliary indentation 16, the upper protuberance 25 fits in the lower indentation 28, and the upper auxiliary protuberance 15 fits in the lower auxiliary indentation 18. The upper auxiliary protuberance 15 thereby rests with one side on an auxiliary surface 34 of the lower projection 5.

The described arrangement assures a stable connection in which a tight fit results between the installation ledges 8 and 9 on their upper sides, and a very tight connection results in the lower area through the two connection profiles. Because of the close fit of four contact surfaces between the lower projection 5 and the tongue 4, penetration of dirt, moisture, etc. is prevented. Also, force can be distributed over these four connection surfaces so that the protuberances and auxiliary protuberances can be relatively small while still preventing the flooring panels 1 and 2 from being laterally pulled apart. The two flooring panels 1 and 2 can be connected with little or even no bracing which reduces the danger of material fatigue. Since the protuberances and auxiliary protuberances can be made relatively small, an intentional separation of the two connection members in the direction opposite arrow P1 can take place without undue leverage on the tongue 4 so that breakage of the lower projection 5 or the tongue 4 can be prevented.

The connection shown in FIGS. 1 and 2 is especially suited for the longitudinal edge of flooring panels 1 and 2, since both panels can be joined in the direction of arrow P1 and subsequently moved in the longitudinal direction of the panel until the cross-ledge of flooring panel 2 reaches the cross-ledge of another flooring panel.

Figure 3:
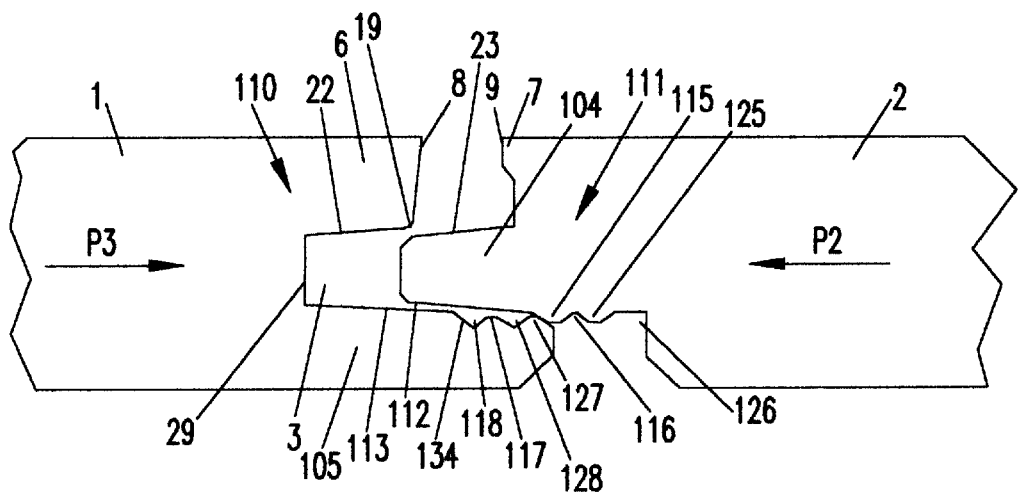
FIG. 3 shows two connection members according to a second embodiment of the invention, in the process of joining.

In the embodiment of FIG. 3, some parts of the connection members 110 and 111 correspond to those in FIGS. 1 and 2. The first connection member 110 of the first flooring panel 1 therefore shows an upper projection 6, a lower projection 105, and a groove 3 formed by the two projections 5 and 6. The connection profile of connection member 110 includes a lower protuberance 127, a lower indentation 128 situated next to the lower protuberance 127 in the direction towards the groove base 29, a lower auxiliary protuberance 117, and a lower auxiliary indentation 118 that, in turn, is bordered by an auxiliary installation surface 134 in the direction of the groove base 29. The second connection member 111 shows a tongue 104 which has an underside having an upper indentation 126 which defines the lower end of the tongue 104. Next to the upper indentation 126 is an upper protuberance 125, and next to the upper protuberance 125 is an upper auxiliary indentation 116 and an upper auxiliary protuberance 115, whereby the upper auxiliary indentation 116 is situated between the upper protuberance 125 and the upper auxiliary protuberance 115.

Figure 4:
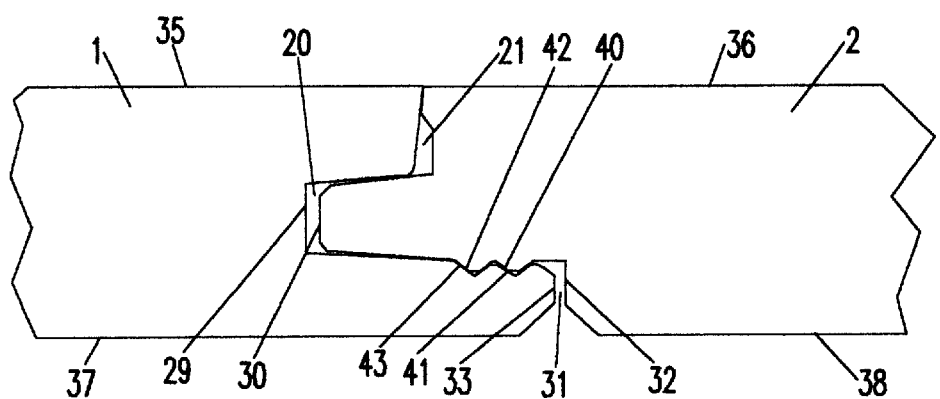
FIG. 4 show the connection members of FIG. 3 after joining.

The depth of the indentations and auxiliary indentations of FIGS. 1 and 2 may, for example, be one to two twentieths of the total height of the flooring panel as shown in FIG. 3 and 4. Thus, the depth as shown in FIGS. 3 and 4 may be, for example, one to three but preferably one to two thirtieths of the total height of the flooring panel.

Both flooring panels 1 and 2 can be joined by a straight-line movement in the direction of arrows P2 and P3, whereby the upper protuberance 125, the upper protuberance 115, the lower protuberance 127 and the lower auxiliary protuberance 117 slide into each other. This movement is facilitated by the rounding of the upper protuberance 125, the upper protuberance 115, the lower protuberance 127 and the lower auxiliary protuberance 117. In this manner, it is basically possible that neither the lower projection 105 nor the tongue 104 needs to be bent during the joining; however, a joining with a slight bending of especially the lower projection 105 is also possible. According to FIG. 4, both members are connected to each other in such a manner that the connection points 40, 41, 42, and 43 are formed between the connection members 110 and 111. In this joining mode, the fit is not as tight as the four connection surfaces mode shown in FIG. 2; however, by using the embodiment of FIGS. 3 and 4 results in a joining without arching motion that still give good tightness with four contact points.

Figure 5:
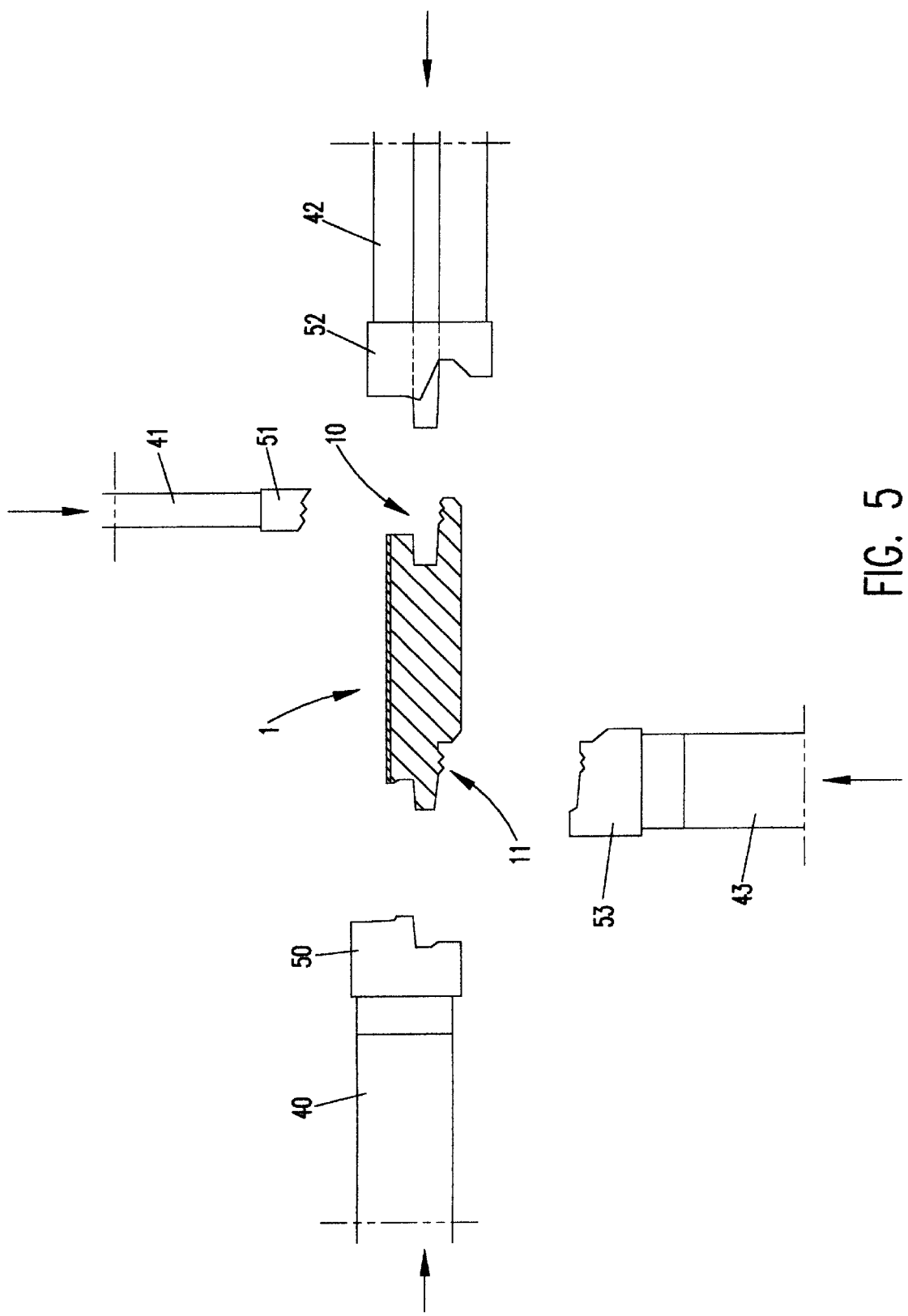
FIG. 5 shows a flooring panel in cross-section, together with tools necessary for the formation of the connection members.

The connection members 10, 11, 110 and 111 can be simply produced according to FIG. 5, inasmuch as appropriate milling machines or other tools 40, 41, 42 and 43 can be moved directly on the members in a straight-line movement in the direction of the arrows without the need for producing receding structures and moving the milling machines in arc-like directions. This is especially useful for the milling heads 50, 51, 52 and 53 which incur less wear and tear.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A flooring panel comprising:
   a first connecting member having an upper projection including a first installation ledge, a lower projection having a lower indentation and a lower protuberance, and a groove situated between the upper projection and the lower projection;
   a second connecting member being positioned on an opposing edge of the flooring panel from the first connecting member, the second connecting member having a second installation ledge and a tongue, the tongue including a lower side having an upper protuberance, an upper indentation, an upper auxiliary protuberance and an upper auxiliary indentation, the second installation ledge cooperating with the groove of the first connecting member of an adjacent flooring panel, the lower indentation is formed so as to fit with the upper protuberance and the upper indentation is formed so as to fit with the lower protuberance of the adjacent flooring panel, wherein
   the tongue and the groove are tapered in the direction of a groove-base located toward an end of the groove,
   the lower projection has a lower auxiliary protuberance for insertion in the upper auxiliary indentation and a lower auxiliary indentation for the reception of the upper auxiliary protuberance of another floor panel, and
   the lower protuberance, lower auxiliary protuberance, lower indentation, and lower auxiliary indentation are located on the lower projection outside the groove and extend to an outer edge of the first connecting member thereby forming a first installation member.

2. The flooring panel according to claim 1, wherein:

an upper side and the lower side of the tongue have even, mutually sloping surfaces; and an upper side of the lower projection and a lower side of the upper projection have mutually sloping even surfaces.

3. The flooring panel according to claim 1, wherein an upper side of the tongue and a lower side of the upper projection, and the lower side of the tongue and an upper side of the lower projection are fitted together when joining the first connection member to the second connection member.

4. The flooring panel according to one of claim 1, wherein the first connecting member and the second connecting member are formed so that the first connecting member and the second connecting member are joined without temporary deformation.

5. The flooring panel according to one of claim 1, further comprising an upper free space being formed between the first installation ledge and the tongue and lower free space being formed between a front side of the tongue and the groove-base of the groove when the first connecting member and the second connecting member are joined.

6. The flooring panel according to one of claim 1, further comprising a gap being formed between a lower edge of the second connecting member and a lower edge of the lower projection upon joining the first connecting member and the second connecting member.

7. The flooring panel according to claim 1, wherein the upper protuberance and the upper auxiliary protuberance of the tongue fit in the lower indentation and the auxiliary indentation of the lower projection, and the lower auxiliary protuberance fits in the upper auxiliary indentation of the tongue upon joining the first connecting member and the second connecting member.

8. The flooring panel according to claim 7, further comprising a slide point on the upper projection of the first connecting member for the installation of the second connecting member of another adjacent panel.

9. The flooring panel according to claim 7, wherein the lower side of the tongue and an upper side of the lower projection have connection members whose protuberances and auxiliary protuberances are rounded and joined together when the connection members of the flooring panel and the adjacent flooring panel are joined together.

10. The flooring panel according to one of claim 1, wherein the upper protuberance of the tongue, the upper auxiliary protuberance of the tongue, the lower protuberance of the lower projection, and the lower auxiliary protuberance of the lower projection are rounded.

11. The flooring panel according to claim 10, wherein the lower auxiliary protuberance extends below or at an equal height with an extension of an upper side of the lower projection.

12. The flooring panel according to claim 10, wherein the first connection member is joined with the second connection member of another flooring panel by a parallel movement to lower sides and/or upper sides of adjacent flooring panels.

* * * * *